United States Patent [19]

Tsugawa

[11] Patent Number: 4,939,455

[45] Date of Patent: Jul. 3, 1990

[54] SENSOR HAVING TWO-WIRE CONNECTION TO LOAD

[75] Inventor: Terumi Tsugawa, Fountain Valley, Calif.

[73] Assignee: Hamilton Standard Controls, Inc., Farmington, Conn.

[21] Appl. No.: 240,785

[22] Filed: Sep. 2, 1988

[51] Int. Cl.[5] ............................................ G01P 3/488
[52] U.S. Cl. .................................... 324/168; 324/160; 324/173; 324/166; 328/5; 307/296.1; 307/519
[58] Field of Search ................ 324/207, 208, 260–263, 324/160–180; 307/296 R, 519, 296.1, 296.3; 328/5; 340/870.31, 870.34, 870.16; 368/2

[56] References Cited

U.S. PATENT DOCUMENTS

| | | | |
|---|---|---|---|
| 3,666,988 | 5/1972 | Bellis | 328/5 X |
| 3,747,010 | 7/1973 | Buck | 328/5 X |
| 3,747,012 | 7/1973 | Buck | 328/5 X |
| 3,935,542 | 1/1976 | Buck | 328/5 X |
| 4,168,443 | 9/1979 | Periot | 328/5 X |
| 4,328,433 | 5/1982 | Hodera et al. | 328/5 X |
| 4,663,601 | 5/1987 | Troutman et al. | 340/870.31 X |
| 4,757,341 | 7/1988 | Tanigawa | 328/5 X |

Primary Examiner—Reinhard J. Eisenzopf
Assistant Examiner—Warren S. Edmonds

[57] ABSTRACT

A sensor is connectable with a load circuit via two conductors. The sensor receives its electrical power from the load circuit via the two conductors and similarly provides its output signal indicative of the sensed phenomenon via the same conductors. An unregulated source potential is provided to a terminal of the sensor from a supply potential via the load circuit. Voltage regulating circuitry in the sensor converts the unregulated source potential to a regulated operating potential for its active circuit elements. Certain output circuitry in the sensor is connected to the terminal having the unregulated source potential for conveying an output signal from the sensor to the load circuit.

3 Claims, 3 Drawing Sheets

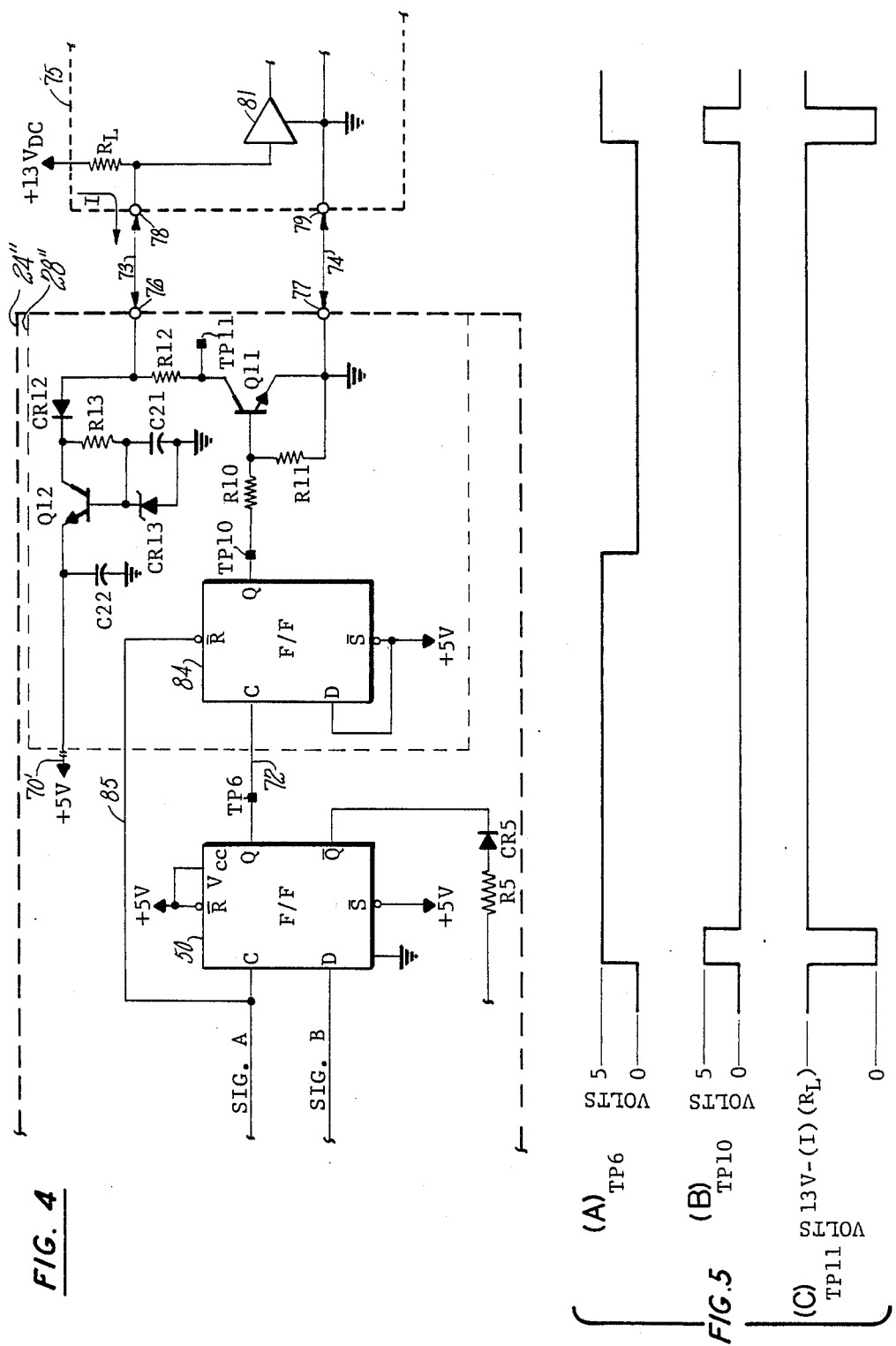

SENSOR HAVING TWO-WIRE CONNECTION TO LOAD

CROSS REFERENCE TO RELATED APPLICATIONS

This application is related to U.S. Ser. No. 07/240,782 (HCI-386) and to U.S. Ser. No. 07/240,783 (HCI-387), filed on even date herewith.

TECHNICAL FIELD

The invention relates to sensors or detectors and more particularly to sensors requiring electrical power from an external source. More particularly still, the invention relates to sensors of a type especially suited for speed detection, as of the wheel of a vehicle.

BACKGROUND ART

Numerous sensors or detectors exist for sensing and providing an indication of some particular phenomenon. Though the types of phenomena being detected may vary greatly, various broad categories of sensors may be perceived. For instance, the output provided by many types of sensors is an electrical signal, and it is to this class of sensor that the present invention pertains.

Within the broad class of sensors which provide an output signal of electrical character, there are some which are capable of generating the electrical signal solely as a result of the phenomenon being sensed. Such sensors might be electrochemical in nature, or may employ a bimetal to generate an electrical signal or, still further, may use a magnetic interaction for generating a signal potential. On the other hand, another type of sensor requires at least some active electronic circuitry to provide the basic output signal and accordingly, relies upon an external source of electrical power or voltage to supply the circuitry internal to the sensor. It is with this latter class of sensor that the present invention is concerned.

Typically, for a sensor incorporating circuitry requiring an external power source, there will be required three conductive leads or wires for connecting the sensor with a subsequent use (or load) device. One wire is typically responsible for supplying the operating potential to the sensor; another wire is responsible for conveying the output signal from the sensor to the load or use circuitry; and the third conductor is responsible for providing a reference potential relative to the operating potential and also with respect to the output signal. Examples of such three-wired sensors may be found in each of the aforementioned applications, U.S. Ser. No. 07/240,782 (HCI-386) and U.S. Ser. No. 07/240,783 (HCI-387), to which reference may be made and which are incorporated herein by reference. The sensors of those applications are intended to measure wheel speed, as in an anti-lock braking system.

In certain applications of sensors of the type requiring an external supply of electrical power, there may be relatively little room available for the running of three wires between the sensor and the load circuit to which it is connected. Moreover, in instances in which conductive wires must be run between the sensor and the load circuit, the opportunity for difficulty in the respective connections between circuits is increased by the number of conductors required. Still further, the cost of each conductor wire and associated connector terminals may be a significant part of the cost of the sensor assembly.

Accordingly, it is a principal object of the invention to provide, for a sensor requiring an external electrical power source, an arrangement employing fewer than three conductors for connecting the sensor with a load circuit.

It is a further object of the present invention to provide a sensor, and particularly a speed sensor, having improved circuitry for providing electrical power thereto and an output therefrom to a load circuit. Included in this object is the provision of input circuitry associated with the load circuit adapted to support the foregoing objects.

DISCLOSURE OF THE INVENTION

According to the invention there is provided an improved combination of a sensing circuit for connection with a load or use circuit utilizing but two conductors for conveying the requisite electrical power to the sensor and the requisite output signal from the sensor to the load circuit. The sensing circuit has one or more active elements requiring a regulated operating potential and a reference potential, and further includes an output circuit for providing an output signal to the load circuit. The output signal is representative of the phenomenon being sensed and, in the illustrated and preferred embodiment, is representative of wheel speed. The load circuit is adapted to receive the output signal and further, is the relative source of a source potential and the reference potential. As part of the improvement, the sensing circuit includes first and second terminals adapted to be conductively connected with the load circuit source potential and with the load circuit reference potential respectively to provide the source potential and the reference potential thereat. Moreover, the output circuit of the sensing circuit includes the first terminal for providing the output signal thereat for connection to the load circuit. Still further, the sensing circuit includes regulated voltage supply circuitry which is operatively connected to the first and the second terminals for receiving the source potential and the reference potential and for providing the regulated operating potential to the sensing circuit.

The load circuit includes, at its input, first and second terminals for the connection with the respective first and second terminals of the sensing circuit. The load circuit further includes a load impedance and signal processing circuitry, each operatively connected to the first terminal of that load circuit. The load impedance is adapted to be connected to a supply voltage for providing the source potential, unregulated, at the first terminal, and the signal processing circuitry is adapted to receive the output signal from the sensing circuit.

The output circuit of the sensing circuit includes a power buffer comprised of a semiconductor operatively connected to the reference potential and to the source potential at the first terminal. The semiconductor is responsive to a control signal from the sensing circuitry for providing the output signal at the first terminal. The semiconductor, particularly if a bipolar transistor, includes a current-shunting resistor in its base circuit for preventing lock-up of the semiconductor in a particular conduction state resulting from powering-up the sensing circuitry with the unregulated source potential.

BRIEF DESCRIPTION OF THE DRAWINGS

FIG. 4 depicts a schematic diagram of an alternative form of the output circuitry and voltage regulating circuitry of the sensor of FIG. 1; and FIG. 5 depicts various waveforms present at various test points (TP) in the circuit of FIG. 4.

BEST MODE(S) FOR CARRYING OUT THE INVENTION

Although the prevent invention may find utilization in any of a number of types of sensors requiring connection with an external source of electrical energy and further required to provide an output signal, it will be described hereinafter in the embodiment of a wheel speed detector, as for example of the type which might be used in an anti-lock braking system. With the exception of the output circuitry and the voltage regulating circuitry of the invention, the remainder of the speed detector or sensor to be hereinafter described will be substantially the same as that described in either of the aforementioned applications U.S. Ser. No. 07/240,782 (HCI-386) and U.S. Ser. No. 07/240,783 (HCI-387), to which reference may be made for additional detail not inconsistent herewith and which is incorporated herein by reference.

Figure 1:
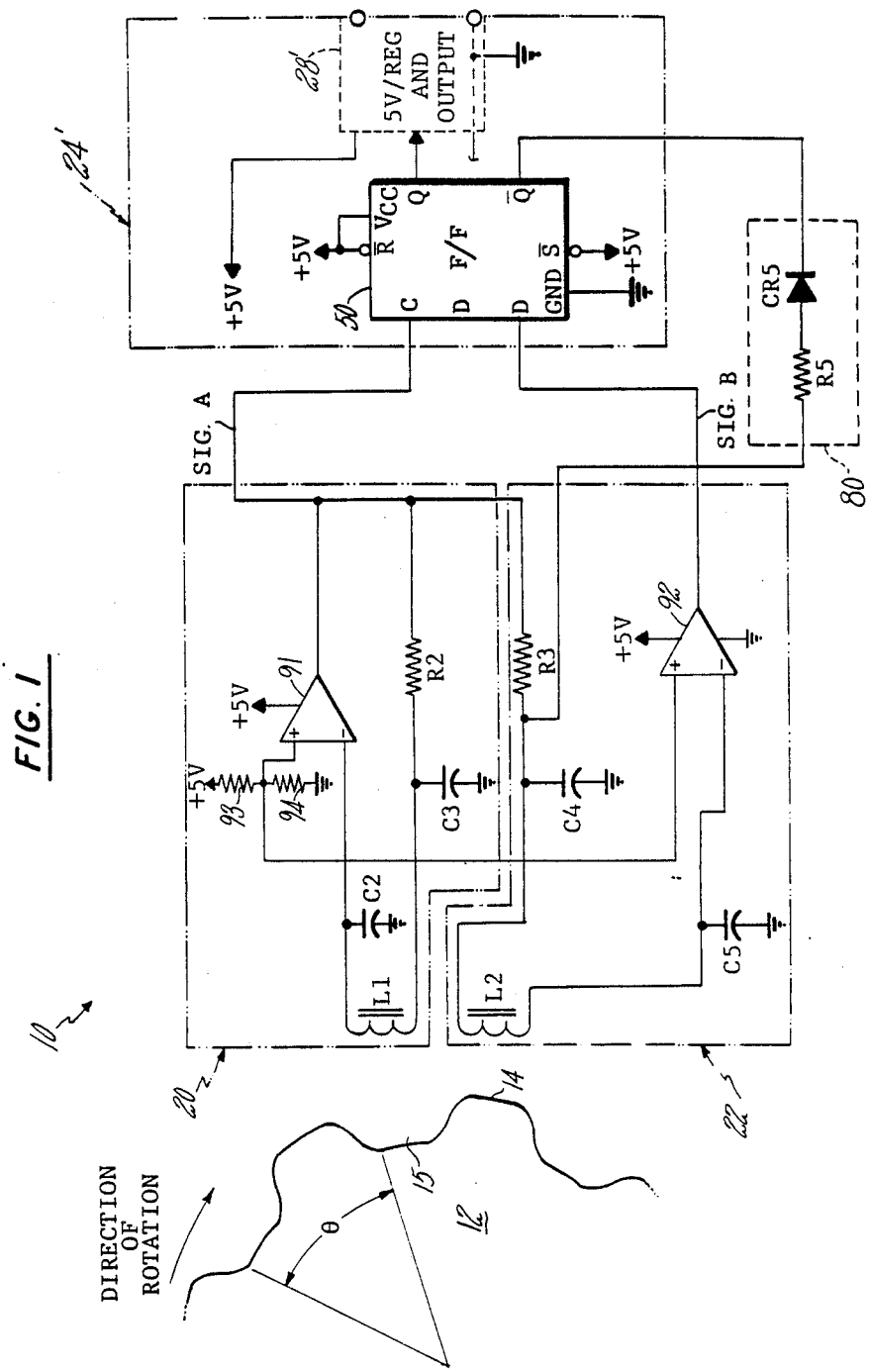
FIG. 1 depicts, partly in block diagrammatic form, a speed sensor or detector incorporating the output circuitry and voltage regulating circuitry in accordance with the invention.

Referring to FIG. 1 there is depicted in diagrammatic form, a speed detector or sensor 10 operatively positioned adjacent a tone wheel 12. The tone wheel 12, and more particularly the pins or teeth 14 thereof, are formed of a metal which will interact with the speed sensor 10. The tone wheel 12 rotates in the direction indicated by the arrow. Its speed of rotation is typically correlated with the speed of some other member, the speed of which is ultimately to be determined, as for instance the speed of an automobile wheel for use in an anti-lock braking system.

Briefly, the tone wheel 12 is provided with a relatively large number of teeth 14 separated by respective intermediate spaces or slots 15. The pitch θ between the same point on successive teeth 14 is uniform about tone wheel 12. A pair of iron-cored coils L1 and L2 provide the physical sensing components which directly interact with the tone wheel 12. The sensing coils L1 and L2 are offset from one another relative to the passing teeth 14 on tone wheel 12 such the change affecting or induced in each coil is relatively offset or out of phase with that of the other. In addition to the coils L1 and L2, the sensor 10 includes a phase sense oscillator 20, a tuned sensor network 22, a phase condition detector 24' and a hysteresis control circuit 80. The phase condition detector 24' is shown as including, within broken lines, the voltage regulating and output circuitry 28' incorporating the invention.

Referring briefly to the circuitry and operation of the "front-end" of the sensor 10, the phase sense oscillator 20 includes an oscillator formed of coil L1, capacitors C2 and C3, a resistor R2 and a comparator 91 connected as a closed loop. Comparator 91 serves to digitize the otherwise sinusoidal waveform and provide a digitized output identified as SIG A. The tuned sensor network 22 includes coil L2, capacitor C4 and C5, resistor R3 and comparator 92. Tuned network 22 is driven by oscillator 20 and similarly provides a digitized output signal, identified as SIG B. SIG A and SIG B are connected to the C and D inputs respectively of a D-type flip-flop 50 in the phase condition detector 24'. Depending upon whether or not SIG B "leads" SIG A at a particular positioning of the tone wheel 12, the Q output of flip-flop 50 will be either a logic high or a logic low. When the phase relation between SIG A and SIG B reverses, the state of the Q output of flip-flop 50 undergoes a transition. That transition, or at least a transition in a particular direction as from a logic low to a logic high state, forms the basis of the reference event signal to be provided as the output from the sensor 10. A hysteresis circuit 80 comprised of a resistor R5 and diode CR5 is connected between the Q output of flip-flop 50 and either the oscillator 20 or tuned network 22 to provide a desired degree of hysteresis.

The various active elements of sensor 10, including comparators 91 and 92 and the flip-flop 50 require connection with a reference potential, such as ground, and an operating potential, such as +5 volts. Although those active elements may employ CMOS devices and may be relatively tolerant of some variations in their operating potentials, it is preferable that the operating potential be regulated. A regulated +5 volt operating potential is provided on lead 70 from voltage regulation and output circuit 28' in a manner to be hereinafter described. Further still, the Q output of flip-flip 50 appears on a conductor designated 72 which extends to the output circuitry 28'. That signal from flip-flip 50 is processed by the output circuit 28; as will be described, for extension to a load or use circuit 75 which may further condition the signal from the sensor 10.

Figure 2:
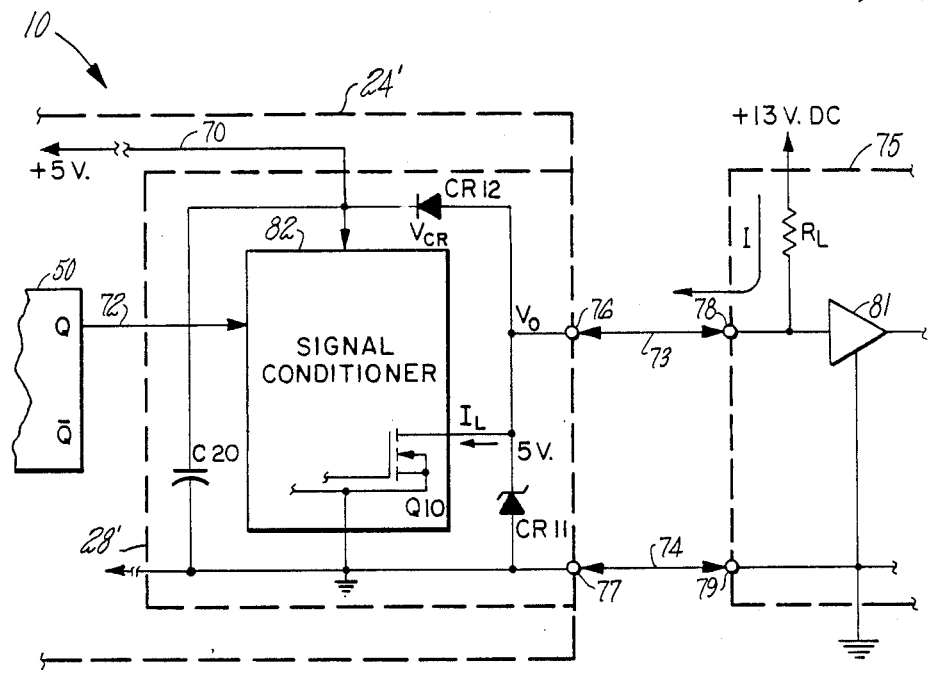
FIG. 2 is a schematic diagram, partly in block diagram form, of the output circuitry and voltage regulation circuitry of the sensor of FIG. 1, shown operatively connected to a load circuit.

In accordance with the invention, reference is made to FIG. 2 for one embodiment of the voltage regulation and output circuitry 28' and the corresponding input circuitry in the use circuit 75 in accordance with the invention. The signal appearing on lead 72 from flip-flop 50 transitions between a logic low and logic high state, with the occurrence of such transition being the desired output event to be provided by the sensor 10 to the load circuit 75. The sole connection of sensor 10 with load circuit 75 is via a pair of conductors designated 73 and 74 connected between respective pairs of terminals on sensor 10 and load circuit 75. The conductors 73 and 74 may take a variety of forms, but most typically are a pair of insulated wires which may be several feet in length. Specifically, sensor 10 includes terminals 76 and 77 and circuit 75 includes terminals 78 and 79. More specifically, conductor 73 connects terminal 76 with terminal 78 and conductor 74 connects terminal 77 with terminal 79. It will be understood that each terminal and respective conductor may also be viewed as an integral unit. Terminals 76 and 77 represent the sole electrical connection of sensor 10 with other circuitry such as load circuit 75. The output signal from sensor 10 to load circuit 75 is generally conveyed via conductor 73 from terminal 76 to terminal 78. Similarly, the supply of a source potential from load circuit 75 to the voltage regulation circuitry 28' for developing the regulated voltage 70 is also provided via terminal 78, conductor 73 and terminal 76. It will be noted in FIG. 2 that a reference potential, such as ground potential, is provided from load circuit 75 via terminal 79 and conductor 74 to terminal 77. That reference potential appearing at terminal 77 of sensor 10 is extended to such other circuitry of the sensor as is required to be referenced to that potential.

Referring briefly to the load or use circuit 75, the terminal 78 provides an input thereto for the output signal from sensor 10 but also serves to supply a source potential to sensor 10. Circuit 75 has been designated a "load" or "use" circuit herein because it is utilizing and/or conditioning the signal received from sensor 10. Stated another way, circuit 75 represents certain intermediate or final circuitry which requires an input signal from sensor 10. Specifically, terminal 78 is connected to an input of an amplifier 81 or similar active element such as a flip-flop, CMOS and/or TTL logic or an input buffer circuit, which serves an initial signal processing function. Also connected to the terminal 78 is an impedance, depicted here as a load resistance $R_L$ and which is connected at its other end to a +13 volt DC supply voltage. That supply voltage may be unregulated and is remote from sensor 10 and is associated with load circuit 75.

Figure 3:
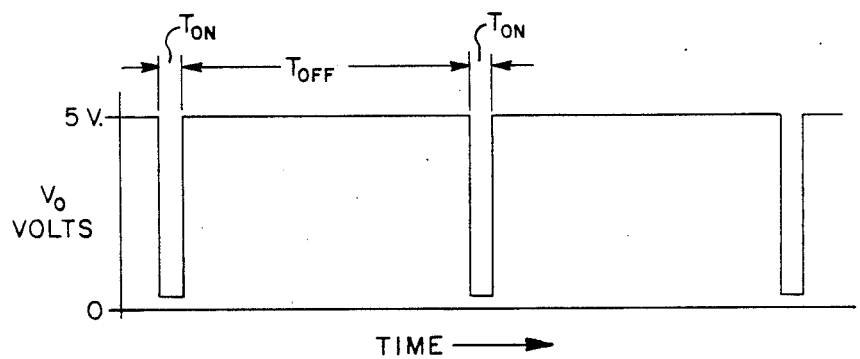
FIG. 3 depicts the waveform of the output signal from the speed sensor of FIGS. 1 and 2.

Returning to a consideration of the circuitry of sensor 10, the signal on lead 72 from flip-flop 50 is extended to the output circuit 28', and specifically to an included signal conditioner circuit 82 shown partly in block diagram form. The signal conditioner 82 is preferably for the purpose of converting the state-transition events on lead 72 to respective short digital pulses and for further providing a measure of power buffering between the flip-flop 50 and the terminals 76, 77. Signal conditioner 82 may include various active CMOS and/or TTL semiconductors to provide the requisite functions, a single NMOS field effect transistor Q10 being depicted herein as the final element of signal conditioner 82. The signal on lead 72 either directly or indirectly controls conduction of the transistor Q10 to provide the appropriate output signal. The drain electrode of Q10 is connected to the terminal 76. A 5-volt zener diode CR11 is connected from the reference potential to the terminal 76 and thus also to the drain electrode of transistor Q10. The zener diode CR11 assures that the voltage $V_O$ appearing at the terminal 76 does not exceed 5 volts, even though the supply voltage at the upper end of resistor $R_L$ in load circuit 75 is 13 volts. Thus, the zener diode CR11 in combination with the resistance $R_L$ serve to assure that the source voltage appearing at terminal 76 does not exceed 5 volts in the illustrated embodiment. However, as depicted in FIG. 3, when the transistor Q10 is driven into conduction via its gate electrode by the control signal from flip-flop 50, it draws a current $I_L$ which is substantially greater than the current normally flowing through $R_L$, and thus causes the voltage at terminals 76 and 78 to drop substantially below the 5-volt source potential existing when the transistor is not conducting. In fact, the low impedance of the conducting transistor Q10 causes the voltage $V_O$ at terminals 76 and 78 to closely approach the reference potential. This signal thus comprises the output from sensor 10 which in turn constitutes the input signal to amplifier 81 in the load circuit 75.

In order to assure that that the +5 volt DC supply on lead 70 to the remaining circuitry of sensor 10 is regulated, or in other words is substantially unaffected by the voltage swings in the source voltage appearing at terminal 76 when the output signal drops to nearly 0 volts, a simple regulation circuit is provided by the diode CR12 and storage capacitor C20. Diode CR12 has its anode connected to terminal 76 and its cathode is connected to one terminal of capacitor C20, the other terminal of that capacitor being connected to the reference potential. The regulated +5 volt supply is obtained at the junction between diode CR12 and capacitor C20. This form of regulated voltage supply circuit is relatively effective in the present speed sensor 10 since the duty cycle during which transistor Q10 conducts relative to its interval of nonconduction is relatively short, as depicted in FIG. 3. During nonconduction of transistor Q10, the 5-volt source potential determined by zener diode CR11 serves to charge capacitor C20 to that level. During the intervals when Q10 is conducting, the diode CR12 is poled such that it prevents discharge of the capacitor C20 through transistor Q10. Assuming the duty cycle or rates of $T_{ON}$ to $T_{OFF}$ is relatively small, the 5-volt level on lead 70 will be maintained. Although an increase in the speed of tone wheel 12 will tend to decrease the interval of $T_{OFF}$ relative to $T_{ON}$, the value of capacitor C20 is typically selected to accommodate that situation at the highest expected speeds. For instance, in the illustrated embodiment, capacitor C20 may have a value of 0.2 uf.

Referring to FIG. 4, there is depicted voltage regulation and output circuitry 28" of an alternate embodiment from that depicted in FIG. 2. With respect to the load circuit 75, the configuration is the same as that of the embodiment of FIG. 2, however the value of the load resistance $R_L$ may differ in accordance with output circuit 28". In the present instance, $R_L$ has a value of one kohm. Included within the dotted block defining the voltage regulation and output circuitry 28" is a further D-type flip-flop 84 having the Q output of flip-flop 50 extended to the C input thereof via lead 72. The D-input of flip-flop 84 is connected to +5 volt such that the Q output thereof transitions to a logic high state each time the C input transitions from a logic low to a logic high state. Note that SIG A is connected, via lead 85, to the $\overline{R}$ input of flip-flop 84 such that the Q output of the flip-flop transitions to its low state when SIG A next returns to its low state. Since SIG A is oscillating between its high and low state at a relatively high frequency, i.e., 20 kHz, but the Q output of flip-flop 50 transitions at a rate which is far slower and is determined by the speed of tone wheel 12, the signal at the Q output of flip-flop 84 will appear as a relatively brief pulse of less than about 0.03 ms. Flip-flop 84, like flip-flop 50, includes CMOS circuitry and might also have been part of the circuitry included in the block designated SIGNAL CONDITIONER 82 OF FIG. 2.

FIG. 5A depicts the waveform appearing at test point TP6 at the Q output of flip-flop 50 and FIG. 5B depicts the pulse-like waveform appearing at TP10 at the Q output of flip-flop 84. As mentioned earlier, the transitioning of the Q output of flip-flop 50 from a low state to a high state represents the timing event which is to ultimately provide the output signal from the sensor 10. It will be noted that the pulse at TP10 coincides with that event.

To provide power buffering, the output signal from flip-flop 84 at TP10 is connected to the terminal 76 via a semiconductor switch such as bipolar transistor Q11. Transistor Q11 is, at least in function, analogous to FET Q10 in FIG. 2. The emitter of transistor Q11 is connected to ground and its collector is connected through a small resistor R12 to the terminal 76. Resistor R12 may typically have a value of 10 ohms. The control signal from TP10 is applied to the base of transistor Q11 via a current limiting resistor R10. A further resistor R11 is connected between the base of transistor Q11 and ground to provide a current shunt path for maintaining the transistor in its nonconducting state during powering-up when the operating potential of +5V may not yet have achieved steady state.

In the absence of a current shunt such as provided by resistor R11, it is possible for a bipolar transistor such as Q11 to begin conduction when the potential at its collector is only several volts and a first pulse, either random or normal, appears at its base. Should that occur, the conduction of the transistor at that time would prevent the regulated supply from reaching its steady state level and the output would lock-up in that state. However, by selecting resistor R11, and also resistor R10, of appropriate values, it is possible to shunt enough current from the base of transistor Q11 to ground during the brief powering-up interval. In the illustrated embodiment, resistor R10 is 7.5 kohm and resistor R11 is 4.3 kohm. These values permit sufficient base current to drive transistor Q11 once the operating potential is at or near steady state.

Referring to FIG. 5C, each time a positive-going pulse appears at TP10 as depicted in FIG. 5B, the normally-nonconducting transistor Q11 is driven into conduction. When transistor Q11 is not conducting, which is the much greater percentage of the time, the current I drawn through the load $R_L$ in load circuit 75 to supply the regulated power supply circuitry, to be hereinafter described, is small. On the other hand, when transistor Q11 is driven into conduction, the current I increases significantly through the much lower impedance path which includes resistor $R_L$, resistor R12 and the low impedance of the conducting transistor. FIG. 5C depicts the resulting signal appearing at TP11 at the collector of transistor Q11 and thus also at terminal 76. During the time transistor Q11 is not conducting, current I may have a value of only about 3 mA such that the source potential appearing at terminal 76 is about 13 volts−3 volts=10 volts. On the other hand, when transistor Q11 conducts, the voltage at terminal 76 drops to nearly 0 volts. This signal, depicted in FIG. 5C, is conveyed from terminal 76 via conductor 73 to terminal 78 of use circuit 75 and thus to the amplifier 81.

The voltage regulating circuitry of FIG. 4 is functionally similar to, but differs from, that of FIG. 2. As previously, a diode CR12 has its anode connected to the terminal 76 and its cathode connected to the further portion of the voltage regulating circuitry. The cathode of diode CR12 is connected to the collector of a transistor Q12, the emitter of which serves as the output for the regulated +5 volt operating potential to the remainder of sensor 10. Diode CR12 serves to isolate the voltage regulating circuitry from transistor Q11 when the latter is conducting. When transistor Q11 is not conducting, the source potential of about 10V DC is applied to diode CR12 to supply the voltage regulating circuitry connected to its cathode.

As an alternative to the single capacitor C20 of FIG. 2, the remainder of the voltage regulating circuitry of FIG. 4 includes the transistor Q12, a resistor R13, a zener diode CR13 and two capacitors C21 and C22. Capacitor C22 has a value of 0.2 uf and is connected between the emitter of transistor Q12 and ground to serve a storage and smoothing function analogous to that of capacitor C20 of FIG. 2. The regulated +5V is provided across capacitor C22 at lead 70′. Zener diode CR13 and noise suppression capacitor C21 are connected in parallel between the base of transistor Q12 and ground and serve, in combination with resistor R13 connected between the base and collector of transistor Q12, to regulate the conduction of that transistor. Zener diode CR13 has a value of 5.1 volt in order to regulate the operating potential. Resistor R13 may have a value of 1 kohm and capacitor C21 is 0.1 uf. The inclusion of transistor Q12 and zener diode CR13 in this configuration gives improved voltage regulation for fluctuations in the source potential, and particularly for drops in that potential.

Thus, it will be seen that the voltage regulating and output circuitry 28″ is functionally similar to that of 28′ in FIG. 2; however, it will be noted that the output signal appearing at terminal 76 now varies between about 10V DC and ground whereas in the FIG. 2 embodiment it was between 5V DC and ground. In either event, the sensing circuit 10 requires but two conductors, 73 and 74, to provide it with the requisite power connections and to supply the output signal to an appropriate load circuit.

Although this invention has been shown and described with respect to detailed embodiments thereof, it will be understood by those skilled in the art that various changes in form and detail thereof may be made without departing from the spirit and scope of the claimed invention.

Having thus described a typical embodiment of the invention, that which is claimed as new and desired to secure by Letters Patent of the United States is:

1. In the combination of a speed sensing circuit for connection with a load circuit, the sensing circuit having one or more active elements requiring a regulated operating potential and a reference potential and output circuit means for providing an output signal to the load circuit, the output signal being representative of the phenomenon being sensed, and wherein said load circuit is adapted to receive said output signal and is the relative source of a source potential and the reference potential, the improvement comprising:

said load circuit including first and second terminals, impedance means and signal processing means, said impedance means and said signal processing means each being operatively connected to said load circuit first terminal, said impedance means being adapted to be connected to a supply voltage for providing the source potential, unregulated, at said load circuit first terminal and said signal processing means being adapted to receive said output signal from said sensing circuit;

said sensing circuit including first and second terminals for conductive connection with said first and said second terminals respectively of said load circuit to provide said source potential and said reference potential respectively thereat;

said output circuit means being operatively connected to said sensing circuit first terminal for providing said output signal at said first terminal for connection to said load circuit;

said sensing circuit including regulated voltage supply means operatively connected to said first and said second terminals for receiving said source potential and said reference potential and for providing said regulated operating potential; and said output circuit means including a power buffer, said buffer comprising a bipolar transistor operatively connected to said reference potential and to said source potential at said first terminal and having a base electrode for receiving a control signal from said sensing circuitry for said transistor to provide said output signal at said first terminal, and further including current shunting means operatively connected with said transistor for preventing lock-up conduction by said transistor during powering-up of the sensing circuitry with the unregulated source potential and until said regulated operating potential is substantially at steady state.

2. The combination of claim 1 wherein said current shunting means comprises resistance means connected between said transistor base electrode and said reference potential.

3. The combination of claim 1 wherein said regulated voltage supply means includes capacitance means and further includes diode means operatively connected to said first terminal and poled to prevent discharge of said capacitance means by a relative decrease in the unregulated source potential at said first terminal.

* * * * *